United States Patent

Amann et al.

[15] 3,688,605
[45] Sept. 5, 1972

[54] TURBINE CONTROL METHOD

[72] Inventors: Charles A. Amann, 984 Satterlee Road, Bloomfield Hills, Mich. 48013; Eric H. Rucins, 8749 Birkhill Drive, Sterling Heights, Mich. 48078

[22] Filed: Nov. 1, 1971

[21] Appl. No.: 194,116

Related U.S. Application Data

[62] Division of Ser. No. 854,651, Sept. 2, 1969.

[52] U.S. Cl.................74/860, 60/39.16 R, 60/39.29
[51] Int. Cl..............................F02g 3/00, B60k 2/00
[58] Field of Search.......74/860, DIG. 5; 60/39.16 R, 60/39.29

[56] References Cited

UNITED STATES PATENTS

| | | |
|---|---|---|
| 3,095,010 | 6/1963 | McLean et al.........60/39.29 X |
| 3,367,106 | 2/1968 | Robinson....................60/39.2 |
| 3,458,118 | 7/1969 | Burge et al.............415/160 X |
| 3,609,967 | 10/1971 | Waldmann........60/39.16 R X |

*Primary Examiner*—Arthur T. McKeon
*Attorney*—Paul Fitzpatrick et al.

[57] ABSTRACT

A vehicle turbine of the gas-coupled type propels the vehicle through a change-speed transmission. To reduce vehicle acceleration time with an acceptable penalty with respect to fuel composition, the compressor of the engine has variable inlet guide vanes with are shifted into a positive prewhirl angle at idling speeds when the transmission is shifted into a drive condition. Thus the engine gas generator has a low speed idle, with axially oriented guide vanes and normal air entrance, when the transmission is in neutral, and a high speed idle with positive prewhirl when the transmission is in drive condition. Also, the vanes are shifted at full speed of the gas generator to provide negative prewhirl and thus reduce the engine speed corresponding to maximum power output. Because of the higher idle and lower maximum speeds, the acceleration time of the gas generator, and thus of the power turbine, is reduced. Because positive prewhirl reduces compressor pressure ratio at the high speed idle, the power turbine does not have an undue tendency to cause creep of the vehicle in the high speed idle.

6 Claims, 3 Drawing Figures

PATENTED SEP 5 1972 3,688,605

TURBINE CONTROL METHOD

This application is a division of our application Ser. No. 854,651 for Turbine Control filed Sept. 2, 1969.

This invention relates to gas turbine power plants, to make them better suited to the requirements for power plants for automotive vehicles. It is particularly directed to a method of improving the acceleration characteristics from idle to medium or full load of a gas turbine powering a vehicle.

Along with their many advantages, gas turbines have significant disadvantages for vehicle propulsion as compared, for example, to gasoline reciprocating engines and diesel engines.

One of these disadvantages is relatively high fuel consumption at idle, particularly with relation to that of the diesel engine. Another disadvantage is a substantial time lag between idle and full power which is undesirable in stop and go driving. It is, thus, highly desirable to find means to improve the acceleration and the part load fuel consumption characteristics of such engines.

The acceleration characteristics of the usual gas turbine engine can be greatly improved by increasing the idle speed of the engine. In the ordinary gas-coupled engine, the minimum satisfactory gas generator idle speed is somewhere near fifty percent of the speed at full power. By stepping up the idle speed to, say, 75 percent, the time required for the gas generator to accelerate to full power output is greatly reduced. As a matter of fact, it is possible to idle the engine at 100 percent gas generator speed by braking the power turbine. However, such high speed idling greatly increases the fuel consumption while the vehicle is stationary.

It is also desirable, for convenience in driving the vehicle, to have the torque of the power turbine sufficiently low when the gas generator is idling that is not necessary to hold the vehicle brakes engaged to prevent vehicle creep. It is desirable to have a characteristic similar to that of a gasoline engine with a torque converter which idles at a speed sufficiently low that the torque converter transmits too small a torque to move the vehicle.

The principle of this invention is based upon the conclusion that the idle speed of the gas generator may be substantially increased, without increasing the gas horsepower which tends to drive the power turbine, by imparting substantial positive prewhirl to the air entering the compressor. Positive prewhirl is a tangential component of air velocity in the direction of rotation of the compressor. Also, to minimize waste of fuel when the vehicle is not in the ready condition for operating, this prewhirl is eliminated when the transmission is put into neutral or park conditions and the engine is then allowed to idle at a low speed idle. Also, the speed of the gas generator at maximum gas horsepower output is reduced somewhat by imparting negative prewhirl (that is, whirl opposite to compressor rotation) to the air entering the compressor when operating near maximum gas generator speed. By these means, a reduction of approximately one-third in the difference between ready idle and full power gas generator speeds may be achieved, with a corresponding very substantial reduction in acceleration time, particularly since the acceleration of the gas generator through the lower part of its speed range is slower than through the higher part of its speed range.

The prewhirl may be controlled by variable-setting inlet guide vanes in the engine compressor.

The nature of the invention and its advantages will be clear to those skilled in the art from the succeeding detailed description of the preferred embodiment of the invention and the accompanying drawings.

Figure 1:
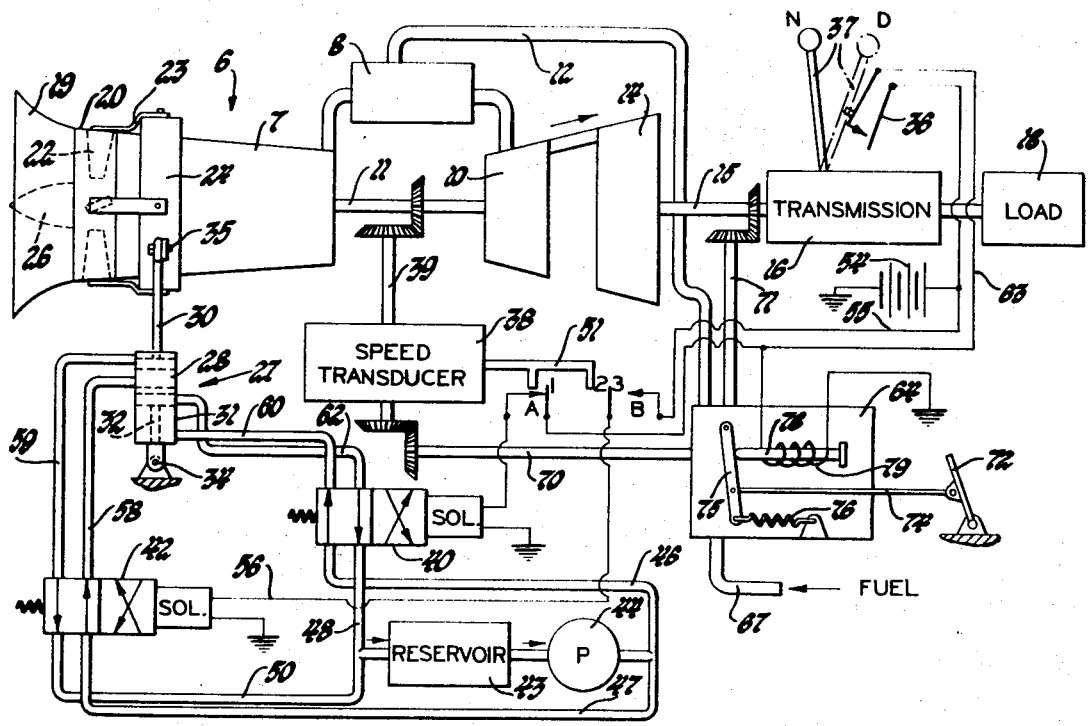
FIG. 1 is a schematic diagram of a vehicle gas turbine installation including controls according to the invention.

FIG. 1 illustrates schematically a gas-coupled gas turbine engine which, as is customary, includes a dynamic compressor 7, a combustion apparatus 8, and a gas generator turbine 10. Turbine 10 drives compressor 7 through a shaft 11, and compressed air flows from the compressor 7 to the combustion apparatus 8 to which fuel is also supplied through a fuel line 12. The fuel is burned in the compressed air and the resulting combustion products flow to turbine 10 to energize it. The exhaust from turbine 10 flows to a power turbine 14 and then to exhaust.

As illustrated, the engine is non-regenerative although, of course, a regenerator may be included without affecting this invention. There are many structural disclosures of such engines, including those in U.S. Pat. No. 2,972,230 to Conklin et al. for Automobile Gas Turbine, U.S. Pat. No. 3,116,605 to Amann et al. for Regenerative Gas Turbine, and U.S. Pat. No. 3,267,674 to Collman et al. for Regenerative Gas Turbine. The power turbine 14, which rotates independently of the gas generator turbine 10, drives through a power output shaft 15 into a transmission or change gear box 16 of any suitable type. The transmission drives a load 18 which, in the preferred environment of the invention, is the driving wheels of a motor vehicle.

The gas turbine engines referred to above do not include variable inlet guide vanes to vary the prewhirl of the air entering the compressor, but such are well known. Structural disclosures of variable inlet guide vane arrangements may be found in U.S. Pat. No. 2,862,654 to Gardiner for Variable Pitch Guide Vanes and U.S. Pat. No. 2,857,092 to Campbell for Variable Compressor Vanes. As illustrated schematically in FIG. 1, the compressor comprises a converging annular inlet 19 and an inlet guide vane structure 20 including an annular cascade of vanes 22, each vane being rotatable about an axis extending radially of the guide vane ring and being movable by an arm 23. The arms 23 are all pivotally connected to an actuating ring 24 encircling the compressor. Ring 24 may be rotated by actuating means to be described to vary the setting or angle of the inlet guide vanes.

Figure 2:
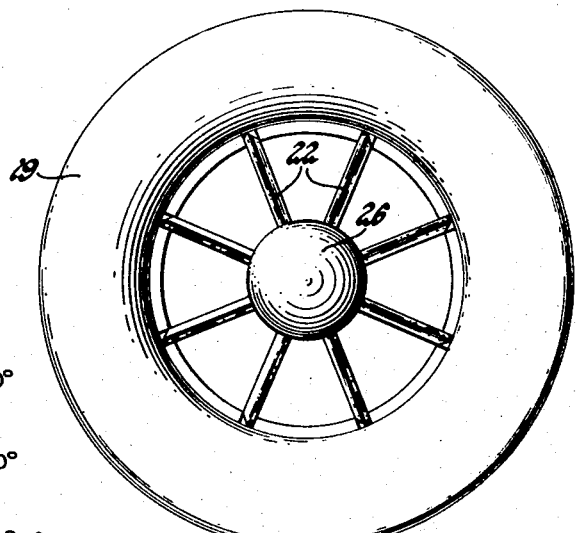
FIG. 2 is a frontal view of the engine compressor inlet.

The inlet structure is shown more structurally in FIG. 2 which also illustrates a center bullet or fairing 26 of the inlet, and a number of variable setting vanes 22. The compressor 7 may be axial-flow or may be centrifugal as in the patents referred to above.

In the described embodiment of the invention, the ring 24 is actuated by a three-position hydraulic actuator 27 which comprises two double-acting hydraulic cylinders fixed together in tandem with one piston rod extending from each end of the actuator. Thus, one cylinder 28 has reciprocable therein a piston and rod assembly 30 and the other cylinder 31 has therein a piston and piston rod assembly 32, the piston rod 32 being connected to a fixed structure at 34. Piston rod 30 is suitably connected by means such as a pin 35 to the actuating ring 24. As applied here, the actuator 27 can move the ring 24 to three positions; one when both pistons are at the inner ends of the cylinders, one when piston 30 is at the outer end, and one when both pistons are at the outer ends of the cylinders. The particular structure of the actuator 27 is not material to this invention, since any suitable three position actuating device may be used or, if desired, a multi-position actuator device. One suitable type of actuator is described in detail in Short et al. U.S. Pat. No. 2,893,353 for Three Position Actuator Cylinder.

The transmission 16 is a suitable form of change speed gear to adapt the torque characteristics of the engine to the requirements of the load. The details of the transmission are immaterial to this invention but it preferably is a power-shift transmission and one in which the transmission controls include a neutral position and at least one drive position. One example of such a transmission is that disclosed in Spreitzer et al. U.S. Pat. No. b 3,093,010. As illustrated schematically in the drawing, transmission 16 includes a control lever 37 which may be manually operated and which has a neutral position indicated by N and at least one drive position indicated by D. The transmission includes a normally open switch 36 which is closed whenever the control is moved to the drive position. Alternatively, switch 36 could be a normally closed switch which is held open only when the control lever is in neutral position.

Switch 36 controls the supply of actuating fluid to the actuator 27 in connection with means responsive to the speed of the gas generator turbine indicated as a speed transducer 38 driven from the gas generator shaft 11 through gearing and accessory drive shaft 39. This can be any suitable device effective to move an output element as a function of gas generator speed. The transducer 38 controls a normally closed switch A and a normally open switch B.

Switches A and B control two solenoid-actuated reversing valves 40 and 42 which control the supply of actuating fluid to the cylinders 28 and 31 of actuator 27. In the illustrated embodiment, the fluid is hydraulic fluid supplied from a reservoir 43 under pressure by a pump 44 which may, for example, be driven from the gas generator shaft 11, and may also, if desired, be the lubricating pump of the engine.

As illustrated, the pump 44 supplies fluid through a branch line 46 to valve 40 and through a branch line 47 to valve 42. These valves are connected back to the reservoir by return lines 48 and 50, respectively. These valves 40 and 42 simply serve to connect the actuating cylinders either normally or reversely to the pump to cause the piston to be driven to one end or the other of the cylinder 28 or 31 in which it reciprocates.

The fluid pressure system could, if desired, be an air pressure system, and specifically the actuator of the Short et al. patent referred to above is adapted for actuation by compressed air.

The speed transducer 38 moves a switch operating plunger 51 which bears lugs which actuate the switches A and B. In the particular embodiment here described, normally closed switch A is opened by the plunger 51 at approximately 58 percent full gas generator speed and remains open at higher speeds, and switch B remains open until the gas generator reaches approximately 95 percent full speed, at which point it is closed and remains closed at higher speeds. A suitable energizing circuit for the solenoid valves is indicated by a circuit from ground through a battery 54 and a positive line 55 to switch B by which it is connected to energizing line 56 for solenoid valve 42, which is connected to ground. When the solenoid valve 42 is not energized, the pressure line 47 is connected through a line 58 to hold the piston and rod assembly 30 in the short cylinder 28 extended and the outer end of the cylinder is connected through line 59 and valve 42 to the return line 50. The inlet vanes 22 are then set at 0° prewhirl. When the solenoid is energized, the connections to lines 58 and 59 are reversed and the piston 30 is pulled inward to shift the ring 24 and move the vanes to the minus 20° setting. Thus, the vanes are moved to this minus 20° setting at top gas generator speed, above about 95 percent rated.

Solenoid valve 40 is likewise shown in its deenergized condition, in which fluid is conducted from pump output line 46 through a line 60 to the outer end of cylinder 31 to hold the piston and rod assembly 32 retracted into the cylinder and the inner end of the cylinder 31 is connected through a line 62 and valve 40 to the return line 48. The valve is shown deenergized because, although switch A is shown closed, switch 36 is open. Now, if the transmission control 35 is shifted into a drive position, switch 36 is closed to complete a circuit from line 55 through switch 36, line 63, switch A, which is assumed closed, to the solenoid valve 40 to reverse the connection to cylinder 31 to extend the piston and rod 32 and move the vanes 22 to the plus 60° prewhirl position.

As previously stated, switch A is closed below approximately 58 percent gas generator speed and opens at 58 percent speed to reverse the connection to cylinder 31 of actuator 27 and thus restore the vanes to the zero prewhirl position. This sequence of events is indicated by the line M on the chart of FIG. 3 which, as will be seen, indicates the vanes as being at plus sixty degrees below 58 percent gasifier speed, shifting to 0° at 58 percent, remaining at 0° to 95 percent, then shifting to minus 20° from 95 to 100 percent gas generator speed. The broken line N indicates the override by the switch 36 which, when it is open, causes the vanes to return to the 0° position for normal low speed or standby idle operation of the power plant.

As previously stated, the purpose of the positive prewhirl is to allow faster idle operation of the gas generator without sufficient gas power output to the power turbine to cause undesirable tendency of the vehicle to creep. The gas generator will not automatically speed up because of the change of inlet vane angle if it is controlled, as is usually the case, by a governor. Gas turbines ordinarily have a fuel control which provides for control of power output and assures safe operation of the engine without surge, overspeed, overheating, flameout, and other disturbances of the operation. One element of the fuel control system of the usual gas-coupled gas turbine engine is an adjustable governor which controls the speed of operation of the gas generator and thus its gas power output to the power turbine. Such a control ordinarily also includes some sort of speed limiting governor on the power turbine which acts to override the gas generator governor and reduce gas horsepower when the power turbine tends to overspeed, although this is not always necessary. Various such arrangements of fuel controls are known; one is disclosed in Zeek U.S. Pat. No. 3,203,176 for Engine Governor, another in Flanigan et al. U.S. Pat. No. 2,976,683 for Gas Turbine Fuel System with Regenerator Temperature Compensation, another in Bevers U.S. Pat. No. 3,332,232 for Fuel Control.

In the preferred embodiment illustrated herein, the gas turbine fuel control omits the power turbine governor or has a fixed setting power turbine governor, and the control to implement the invention is effected by a gas generator governor in the fuel control. Referring to FIG. 1, a fuel control 64 is supplied with fuel under pressure from any suitable source through a line 67 and meters fuel to the engine through the line 12 extending to the combustion apparatus 8. The control 64 receives an input of gas generator speed from shaft 39 and suitable transmission means illustrated by the gearing and shaft 70. It also receives an input of power turbine speed for the power turbine overspeed governor through a shaft 71 geared to the power turbine output shaft 15. Additionally, the control 64 receives an input of desired power output or gas generator speed which is transmitted from a control indicated as a foot throttle pedal 72 through linkage 74 to a swinging input arm 75 on the fuel control. Arm 75 may be considered to be biased counterclockwise or in the direction of decreasing speed and power by a tension spring 76. The minimum speed position of arm 75 is determined by a movable stop 78 which has a position of rest in which the arm 75 moves to the minimum power or standby idle position and a second position in which the arm 75 is held farther in the counterclockwise direction to call for a higher idle speed. The variable stop 78 is moved to the high speed position by suitable means such as solenoid 79 energized from line 63 whenever the transmission switch 36 is closed.

Thus, the engine may operate at a low speed idle with the inlet vanes at 0° and the transmission in neutral. When the transmission is shifted to a drive condition, the vanes are shifted to 60° positive prewhirl as shown on the line M in FIG. 3. At the same time, the stop 78 is energized to boost the speed setting of the gas generator governor to cause it to run just below the 58 percent speed point.

As the foot throttle 72 is actuated to cause the vehicle to move off, the governor setting is raised and the gas generator speeds up, causing the speed transducer 38 to open switch A and thereby put the inlet guide vanes back to the zero prewhirl position. Finally, as the power is increased and the engine accelerates toward maximum gas generator speed, the switch B is closed and the vanes are given a minus 20° setting for full power operation.

Figure 3:
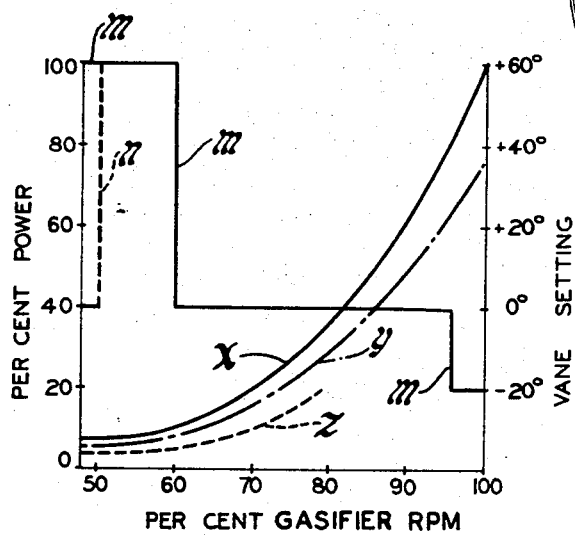
FIG. 3 is a graphical representation of operating conditions at different speeds and vane angle conditions.

The effect of this may be appreciated more clearly from the curves indicated as X, Y, and Z in FIG. 3. Curve X represents the operation of the engine with minus 20° prewhirl through the speed range from idle below 50 percent speed to 100 percent speed at full power. Note that gas horsepower supplied to the power turbine increases from about 8 percent to about 100 percent over this speed range. The curve Y indicates operation with the vanes set at 0°, in which case the power output is lower and finally increases to about 80 percent normal at full speed. The curve Z indicates the result of operation with the 60° positive prewhirl with the result that the power output is very much less than the value associated with normal operation of the engine. Thus, the higher idle speed may be maintained without generation of sufficient gas horsepower to create objectionable creep problems in the vehicle, since gas horsepower and therefore power turbine torque remain low.

The detailed description of the preferred embodiment of the invention for the purpose of explaining the principles thereof is not to be regarded as limiting the invention, as various modifications may be made by the exercise of skill in the art.

We claim:

1. A method of operating a gas-coupled gas turbine engine including a gas generator with a dynamic compressor having means for varying inlet prewhirl and including a power turbine energized by the gas generator, so as to reduce gas generator acceleration time from an idling gas generator condition giving low power turbine output torque to a full speed gas generator condition giving full power turbine output torque, comprising operating the gas generator compressor with substantial positive inlet prewhirl at idling and reducing the prewhirl at higher gas generator speeds.

2. A method of operating a gas-coupled gas turbine engine including a gas generator with a dynamic compressor having means for varying inlet prewhirl and including a power turbine energized by the gas generator, so as to reduce gas generator acceleration time from an idling gas generator condition giving low power turbine output torque to a full speed gas generator condition giving full power turbine output torque, comprising operating the gas generator compressor with substantial positive inlet prewhirl at idling and reducing the prewhirl at higher gas generator speeds, and comprising providing negative inlet prewhirl in the compressor at full gas generator speed.

3. A method of operating a gas-coupled gas turbine power plant including a gas generator with a dynamic compressor having means for varying inlet prewhirl, a power turbine energized by the gas generator, and a power transmission for transmitting power from the power turbine having neutral and power-transmitting conditions, so as to reduce gas generator acceleration time from an idling gas generator condition giving low power turbine output torque to a full speed gas generator condition giving full power turbine output torque, comprising operating the gas generator compressor with substantial positive inlet prewhirl at idling gas generator condition when the power transmission is in the power-transmitting-condition and reducing the prewhirl when the transmission is in the neutral condition and when the gas generator speed is increased above the idling setting.

4. A method of operating a gas-coupled gas turbine power plant including a gas generator with a dynamic compressor having means for varying inlet prewhirl, a power turbine energized by the gas generator, and a power transmission for transmitting power from the power turbine having neutral and power-transmitting conditions, so as to reduce gas generator acceleration time from an idling gas generator condition giving low power turbine output torque to a full speed gas generator condition giving full power turbine output torque, comprising operating the gas generator compressor with substantial positive inlet prewhirl at idling gas generator condition when the power transmission is in the power-transmitting-condition and reducing the prewhirl when the transmission is in the neutral condition and when the gas generator speed is increased above the idling setting, and also providing negative inlet prewhirl in the compressor at full gas generator speed.

5. A method of operating a gas-coupled gas turbine engine, including a gas generator with a dynamic compressor having means for varying inlet prewhirl and including a power turbine energized by the gas generator, so as to reduce gas generator acceleration time from an idling gas generator condition giving low power turbine output torque to a full speed gas generator condition giving full power turbine output torque and to improve fuel economy of the engine, comprising operating the gas generator compressor with substantial positive inlet prewhirl at idling when the power turbine is connected to a load and reducing the prewhirl at idling when the power turbine is disconnected from the load.

6. A method of operating a gas-coupled gas turbine engine, including a gas generator with a dynamic compressor having means for varying inlet prewhirl and including a power turbine energized by the gas generator, so as to reduce gas generator acceleration time from an idling gas generator condition giving low power turbine output torque to a full speed gas generator condition giving full power turbine output torque and to improve fuel economy of the engine, comprising operating the gas generator compressor with substantial positive inlet prewhirl at idling when the power turbine is connected to a load, reducing the prewhirl at idling when the power turbine is disconnected from the load, and decreasing the gas generator idling speed when the power turbine is disconnected from the load.

* * * * *